(12) United States Patent
Ayabe et al.

(10) Patent No.: US 9,574,068 B2
(45) Date of Patent: Feb. 21, 2017

(54) RESIN ADDITIVE MASTER BATCH

(75) Inventors: Takashi Ayabe, Saitama (JP); Kenji Yamashita, Saitama (JP); Naoki Yamamoto, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 157 days.

(21) Appl. No.: 14/373,423

(22) PCT Filed: Jul. 31, 2012

(86) PCT No.: PCT/JP2012/069492
§ 371 (c)(1),
(2), (4) Date: Jul. 21, 2014

(87) PCT Pub. No.: WO2013/114652
PCT Pub. Date: Aug. 8, 2013

(65) Prior Publication Data
US 2014/0378586 A1  Dec. 25, 2014

(30) Foreign Application Priority Data

Feb. 1, 2012 (JP) .................. 2012-019623

(51) Int. Cl.
| C08L 23/00 | (2006.01) |
| C08K 5/098 | (2006.01) |
| C08K 5/3435 | (2006.01) |
| C08K 5/3475 | (2006.01) |
| C08J 3/22 | (2006.01) |
| C08K 5/527 | (2006.01) |
| C08L 23/02 | (2006.01) |
| C08L 23/04 | (2006.01) |
| C08L 23/10 | (2006.01) |
| C08K 5/134 | (2006.01) |

(52) U.S. Cl.
CPC ........... *C08K 5/3475* (2013.01); *C08K 5/1345* (2013.01); *C08K 5/3435* (2013.01); *C08K 5/527* (2013.01); *C08L 23/02* (2013.01); *C08L 23/04* (2013.01); *C08L 23/10* (2013.01); *C08K 2201/012* (2013.01)

(58) Field of Classification Search
CPC .............. C08J 3/22; C08J 3/226; C08L 23/00; C08L 23/02; C08L 23/10; C08K 5/0083; C08K 5/098; C08K 5/3435; C08K 5/3475
See application file for complete search history.

(56) References Cited

U.S. PATENT DOCUMENTS

| 4,467,061 A * | 8/1984 | Yamamoto ........... C08K 5/0091 524/299 |
| 5,837,759 A | 11/1998 | Trauth et al. |
| 2010/0093899 A1* | 4/2010 | Saitou ..................... C08J 3/226 524/99 |
| 2011/0259464 A1 | 10/2011 | Lacroix et al. |

FOREIGN PATENT DOCUMENTS

| AU | 632553 B2 | 10/1990 |
| EP | 2 112 200 A1 | 10/2009 |
| JP | 2-294345 A | 12/1990 |
| JP | 9-052956 A | 2/1997 |
| JP | 10-512320 A | 11/1998 |
| JP | 2001-123021 A | 5/2001 |
| JP | 2008-189822 A | 8/2008 |
| JP | 2009-102633 A | 5/2009 |
| WO | WO 96/22325 A1 | 7/1996 |
| WO | WO 2011/139635 A1 | 11/2011 |

OTHER PUBLICATIONS

Extended European Search Report, issued Oct. 20, 2015, for European Application No. 12867282.1.
International Search Report issued in PCT/JP2012/069492, mailed on Oct. 30, 2012.

\* cited by examiner

*Primary Examiner* — Brieann R Fink
(74) *Attorney, Agent, or Firm* — Birch, Stewart, Kolasch & Birch, LLP

(57) ABSTRACT

Provided is an additive masterbatch having excellent storage stability (agglomeration resistance), which also has reduced surface tackiness despite comprising a low-melting-point resin additive at a high concentration. The additive masterbatch of the present invention is characterized by comprising, with respect to 100 parts by mass of (A) a polyolefin resin, 65 to 300 parts by mass of (B) a resin additive having a melting point of not higher than 80° C.; and 0.8 to 24 parts by mass of (C) a benzotriazole-based ultraviolet absorber.

9 Claims, No Drawings

RESIN ADDITIVE MASTER BATCH

TECHNICAL FIELD

The present invention relates to a resin additive masterbatch and a polyolefin resin composition comprising the same (hereinafter, also simply referred to as "masterbatch" and "resin composition", respectively). More particularly, the present invention relates to a polyolefin masterbatch which comprises a resin additive having a melting point of not higher than 80° C. at a high concentration; and a polyolefin resin composition comprising the same.

BACKGROUND ART

Resin additives such as phenolic antioxidants, ultraviolet absorbers and hindered amine compounds are known to inhibit deterioration of organic matters such as synthetic resins caused by light and/or heat.

In general, a compound to be used as a resin additive is preferably one which has a high melting point and shows limited plasticization of a resin and evaporation from a resin, such as tetrakis(3-(3,5-di-tert-butyl-4-hydroxyphenyl)propionyloxymethyl)methane or tris(2,4-di-tert-butylphenyl) phosphite. However, an additive having an excessively high molecular weight cannot move in a resin, so that its stabilizing effect tends to be small.

Meanwhile, low-melting-point compounds such as stearyl (3,5-di-tert-butyl-4-hydroxyphenyl)propionate and bis(2,2,6,6-tetramethylpiperidyl)sebacate have a relatively low molecular weight and thus exhibit excellent initial stabilizing effect; however, since they readily evaporate from a resin, their long-term stabilizing effect is poor. In addition, those compounds that are in the liquid, viscous or powder form generate large aggregates during storage due to caking and are thus poor in the ease of handling; therefore, in order to improve the ease of handling, these compounds are required to be masterbatched.

However, when an ordinary hindered amine compound or benzoate compounds is used in a polyolefin resin, it exhibits low compatibility with the resin; therefore, in the preparation of a masterbatch comprising such a compound at a high concentration, there is a problem that a condition where the hindered amine compound or benzoate compound bleeds out to the pellet surface and the resulting pellets adhere to each other to form an aggregate is generated, that is, a problem of agglomeration. Particularly, in cases where a hindered amine compound having a low melting point (for example, a melting point of not higher than 80° C.) is used, it is melted and bleeds out under a high temperature of summertime or the like. Such a hindered amine compound is also solidified when cooled to cause solidification of masterbatch pellet; therefore, there is a drawback in terms of the storage stability (agglomeration resistance).

For example, those hindered amine compounds that are obtained by a reaction between 2,2,6,6-tetramethyl piperidinol and fatty acid exhibit excellent light stability effect; however, they are likely to be in the form of liquid at a low molecular weight. Therefore, when such hindered amine compounds are masterbatched with a resin so as to improve the ease of handling, there is a problem that the additive tends to bleed out to the surface of the masterbatched resin composition to show adhesive property.

As a method for improving the surface tackiness caused by bleeding of an additive component in such resin additive masterbatches, there have been proposed, for example, a method in which tackiness is suppressed by masterbatching with an oil-absorbing polymer (Patent Document 1), a microencapsulation method (Patent Document 2) and a method in which tackiness is suppressed by masterbatching with an organic acid metal salt (Patent Document 3). However, when an oil-absorbing polymer is used, it remains in the resulting resin composition. In addition, for example, microencapsulation is costly. Therefore, none of these proposed methods is satisfactory.

RELATED ART DOCUMENTS

Patent Documents

Patent Document 1: Japanese Unexamined Patent Application Publication No. H9-52956
Patent Document 2: Japanese Translated PCT Patent Application Laid-open No. H10-512320
Patent Document 3: Japanese Unexamined Patent Application Publication No. 2008-189822

SUMMARY OF THE INVENTION

Problems to be Solved by the Invention

In view of the above, an object of the present invention is to provide an additive masterbatch which shows excellent storage stability (agglomeration resistance) and has reduced surface tackiness despite comprising a low-melting-point resin additive at a high concentration.

Means for Solving the Problems

In order to solve the above-described problems, the present inventors intensively studied and discovered that the above-described problems can be solved by incorporating a prescribed amount of a benzotriazole-based ultraviolet absorber into a masterbatch comprising a low-melting-point resin additive (melting point: not higher than 80° C.), thereby completing the present invention.

That is, the resin additive masterbatch of the present invention comprises, with respect to 100 parts by mass of (A) a polyolefin resin, 65 to 300 parts by mass of (B) a resin additive having a melting point of not higher than 80° C.; and 0.8 to 24 parts by mass of (C) a benzotriazole-based ultraviolet absorber.

In the resin additive masterbatch of the present invention, it is preferred that the above-described (B) resin additive having a melting point of not higher than 80° C. be at least one hindered amine compound.

In the resin additive masterbatch of the present invention, it is preferred that the above-described (B) resin additive having a melting point of not higher than 80° C. be at least one compound represented by the following Formula (1):

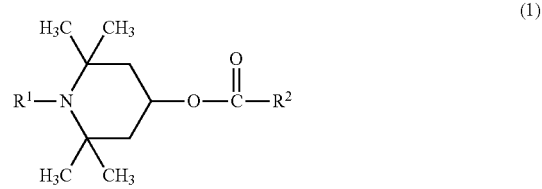

(wherein, $R^1$ represents a hydrogen atom, a hydroxy group, an alkyl, hydroxyalkyl, alkoxy or hydroxyalkoxy group having 1 to 30 carbon atoms, or an oxy radical; and $R^2$ represents an alkyl group having 1 to 30 carbon atoms or an alkenyl group having 2 to 30 carbon atoms).

Further, in the resin additive masterbatch of the present invention, it is preferred that the $R^2$ in the above-described Formula (1) be a mixture of alkyl groups having 8 to 26 carbon atoms.

Further, in the resin additive masterbatch of the present invention, it is preferred that the above-described (B) resin additive having a melting point of not higher than 80° C. comprises at least one hindered amine compound and at least one benzoate compound represented by the following Formula (4); and that the content ratio of the hindered amine compound(s) and the benzoate compound(s) be, in terms of mass ratio, in the range of 1:1 to 4:1:

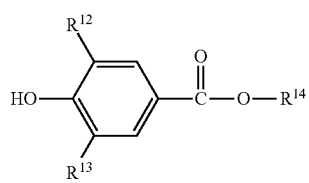
(4)

(wherein, $R^{12}$ and $R^{13}$ each independently represent a hydrogen atom, an alkyl group having 1 to 12 carbon atoms or an arylalkyl group having 7 to 30 carbon atoms; and $R^{14}$ represents an alkyl group having 1 to 30 carbon atoms).

Further, in the resin additive masterbatch of the present invention, it is preferred that the above-described (B) resin additive having a melting point of not higher than 80° C. comprises at least one hindered amine compound represented by the above-described Formula (1) and at least one benzoate compound represented by the following Formula (4); and that the content ratio of the hindered amine compound(s) and the benzoate compound(s) be, in terms of mass ratio, in the range of 1:1 to 4:1.

Further, in the resin additive masterbatch of the present invention, it is preferred that the above-described (C) benzotriazole-based ultraviolet absorber be at least one compound represented by the following Formula (2) or (5):

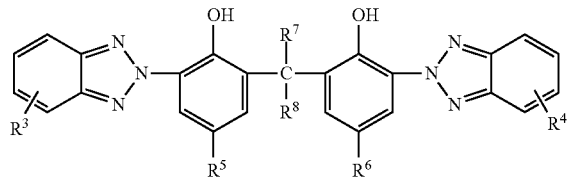
(2)

(wherein, $R^3$ and $R^4$ each independently represent a hydrogen atom, a chlorine atom or an alkyl group having 1 to 4 carbon atoms; $R^5$ and $R^6$ each independently represent a hydrogen atom or an alkyl group having 1 to 18 carbon atoms; and $R^7$ and $R^8$ each independently represent a hydrogen atom or an alkyl group having 1 to 4 carbon atoms); or

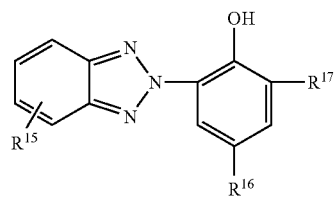
(5)

(wherein, $R^{15}$ represents a hydrogen atom, a chlorine atom or an alkyl group having 1 to 4 carbon atoms; and $R^{16}$ and $R^{17}$ each independently represent a hydrogen atom, an alkyl group having 1 to 18 carbon atoms or an aralkyl group having 7 to 18 carbon atoms).

It is also preferred that the resin additive masterbatch of the present invention further comprises at least one (D) metal aromatic phosphate represented by the following Formula (3) in an amount of 0.3 to 5 parts by mass with respect to 100 parts by mass of the (A) polyolefin resin:

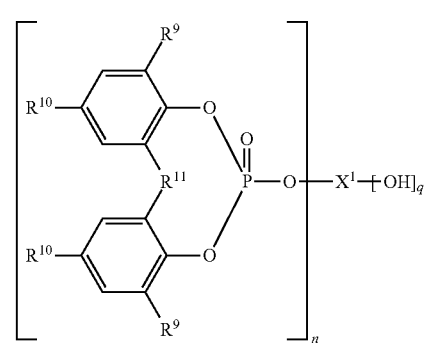
(3)

(wherein, $R^9$ represents an alkyl group having 4 to 8 carbon atoms; $R^{10}$ represents a hydrogen atom or an alkyl group having 1 to 8 carbon atoms; $R^{11}$ represents an alkylidene group having 1 to 4 carbon atoms; and $X^1$ represents an alkali metal atom, an alkaline earth metal atom or an aluminum atom, with provisos that: when $X^1$ is an alkali metal atom, n is 1 and q is 0; when $X^1$ is an alkaline earth metal atom, n is 2 and q is 0; and when $X^1$ is an aluminum atom, n is 1 or 2 and q is (3−n)).

The polyolefin resin composition of the present invention comprises the above-described resin additive masterbatch in a polyolefin resin.

Effects of the Invention

According to the present invention, an additive masterbatch which shows excellent storage stability (agglomeration resistance) and has reduced surface tackiness despite comprising a low-melting-point resin additive at a high concentration can be provided.

MODE FOR CARRYING OUT THE INVENTION

Preferred modes of the present invention will now be described in detail.

As the (A) polyolefin resin to be used in the present invention, any polyolefin can be employed without any particular restriction, and examples thereof include α-olefin homopolymers and copolymers, such as polypropylenes, isotactic polypropylenes, syndiotactic polypropylenes, hemi isotactic polypropylenes, stereoblock polypropylenes, cycloolefin polymers, polyethylenes, low-density polyethylenes, linear low-density polyethylenes, high-density polyethylenes, polybutene-1, poly-3-methylbutene, poly-3-methyl-1-pentene, poly-4-methyl-1-pentene and ethylene-propylene copolymers. A particularly preferred (A) polyolefin resin is, for example, polypropylene.

Examples of the (B) resin additive having a melting point of not higher than 80° C. that is used in the present invention include antioxidants, ultraviolet absorbers, light stabilizers and mixtures thereof. Examples of an antioxidant having a melting point of not higher than 80° C. include phenolic antioxidants; phosphorus-based antioxidants such as phosphite-based antioxidants; and sulfur-based antioxidants such as thioether-based antioxidants.

Examples of an ultraviolet absorber having a melting point of not higher than 80° C. include salicylic acid-based ultraviolet absorbers, benzophenone-based ultraviolet absorbers and cyanoacrylate-based ultraviolet absorbers.

Examples of a light stabilizer having a melting point of not higher than 80° C. include hindered amine compounds.

More specifically, examples of the phenolic antioxidants include stearyl(3,5-di-tert-butyl-4-hydroxyphenyl)propionate, thiobis(3-(3,5-di-tert-butyl-4-hydroxyphenyl)propionyloxy)ethyl, triethylene glycol-bis[(3-tert-butyl-4-hydroxy-5-methylphenyl)propionate], 2,4-bisoctylthio-6-(3,5-di-tert-butyl-4-hydroxyanilino)-s-triazine, 2-methyl-4,6-bis(octylthiomethyl)phenol, 2,4-dimethyl-6-(1-methylpentadecyl)phenol, esters of branched C7-9 mixed alcohol and (3,5-di-tert-butyl-4-hydroxyphenyl)propionic acid, and 2,2-thiobis(4-methyl-6-tert-butylphenol).

Examples of a phosphite-based antioxidant having a melting point of not higher than 80° C. include triphenyl phosphite, trisnonylphenyl phosphite, distearylpentaerythritol diphosphite, bisnonylphenylpentaerythritol diphosphite, phosphites of bisphenol A and C12-15 mixed alcohol, diphenyl-2-ethylhexyl phosphite, diphenylisodecyl phosphite, triisodecyl phosphite, phosphites of 1,1-butylidenebis(2-methyl-4-hydroxy-5-tert-butylphenyl) and tridecyl alcohol, and phosphites of 1,1,3-tris(2-methyl-4-hydroxy-5-tert-butylphenyl)butane and tridecyl alcohol.

Examples of a thioether-based antioxidant having a melting point of not higher than 80° C. include dilauryl thiodipropionate, ditridecyl thiodipropionate, distearyl thiodipropionate, pentaerythritol tetrakis(3-dodecylthiopropionate) and 4,4-thiobis(2-tert-butyl-5-methylphenol)bis-3-(dodecylthio)propionate.

Examples of an ultraviolet absorber having a melting point of not higher than 80° C. include hexadecyl-3,5-di-tert-butyl-4-hydroxybenzoate, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, polymers of 4-(2-acryloyloxy)ethoxy-2-hydroxybenzophenone, 2-(4-octyloxyphenyl)-4,6-bis(2,4-dimethylphenyl)-1,3,5-triazine, 2-(4-isooctyloxyphenyl)-4,6-bis(2,4-dimethylphenyl)-1,3,5-triazine, 2-(2-hydroxy-4-(3-(2-ethylhexyl-1-oxy)-2-hydroxypropyloxy)phenyl)-4,6-bis(2,4-dimethylphenyl)-1,3,5-triazine, 2'-ethylhexyl-2-cyano-3-phenyl cinnamate and N-(2-ethoxyphenyl)-N'-(4-isododecylphenyl)oxamide.

Examples of a hindered amine compound having a melting point of not higher than 80° C. include fatty acid esters of 2,2,6,6-tetramethyl-4-piperidinol, bis(2,2,6,6-tetramethyl-4-piperidyl)sebacate, mixtures of bis(1,2,2,6,6-pentamethyl-4-piperidyl)sebacate and methyl-1,2,2,6,6-pentamethyl-4-piperidyl sebacate, butanetetracarboxylic acid tetraesters of mixed alcohols of 1,2,2,6,6-pentamethylpiperidinol and tridecyl alcohol, butanetetracarboxylic acid tetraesters of mixed alcohols of 2,2,6,6-tetramethylpiperidinol and tridecyl alcohol, bis(1-octyloxy-2,2,6,6-pentamethyl-4-piperidyl)sebacate, polyesters of 1-(2-hydroxyethyl)-2,2,6,6-tetramethyl-4-piperidinol and butanedioic acid, reaction products between 2,2,6,6-tetramethyl-4-(2-propenyloxy)piperidine and methyl hydrogen siloxane, mixtures of dodecyl-3-(2,2,4,4-tetramethyl-21-oxo-7-oxa-3,20-diazodispiro(5.1.11.2)heneicosan-20-yl)propionate and tetradecyl-3-(2,2,4,4-tetramethyl-21-oxo-7-oxa-3,20-diazodispiro(5.1.11.2)heneicosan-20-yl)propionate, mixtures of dodecyl-N-(2,2,6,6-tetramethylpiperidin-4-yl)-b-alaninate and tetradecyl-N-(2,2,6,6-tetramethylpiperidin-4-yl)-b-alaninate, 3-dodecyl-N-(2,2,6,6-tetramethylpiperidin-4-yl) succinimide, and 2-dodecyl-N-(1-acetyl-2,2,6,6-tetramethylpiperidin-4-yl).

The above-described (B) resin additive has a melting point of not higher than 80° C., preferably not higher than 60° C., and it may be one which is in the liquid state at normal temperature.

The above-described (B) resin additive is preferably a hindered amine compound, more preferably a compound represented by the following Formula (1):

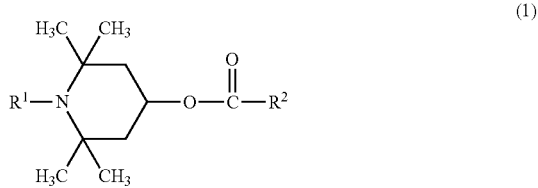

(wherein, $R^1$ represents a hydrogen atom, a hydroxy group, an alkyl, hydroxyalkyl, alkoxy or hydroxyalkoxy group having 1 to 30 carbon atoms, or an oxy radical; and $R^2$ represents an alkyl group having 1 to 30 carbon atoms or an alkenyl group having 2 to 30 carbon atoms).

Examples of the alkyl group having 1 to 30 carbon atoms that may be represented by the $R^1$ and $R^2$ in the above-described Formula (1) include methyl, ethyl, propyl, isopropyl, butyl, isobutyl, sec-butyl, tert-butyl, pentyl, sec-pentyl, tert-pentyl, hexyl, heptyl, octyl, isooctyl, 2-ethylhexyl, tert-octyl, nonyl, isononyl, decyl, undecyl, dodecyl, tridecyl, tetradecyl, pentadecyl, hexadecyl, heptadecyl and octadecyl. Particularly, $R^2$ is preferably a mixture of alkyl groups having 8 to 26 carbon atoms.

Further, examples of the hydroxyalkyl group having 1 to 30 carbon atoms that may be represented by the $R^1$ in the above-described Formula (1) include the above-described alkyl groups substituted with a hydroxyl group, such as hydroxyethyl, 2-hydroxypropyl and 3-hydroxypropyl.

Further, examples of the alkoxy group having 1 to 30 carbon atoms that may be represented by the $R^1$ in the above-described Formula (1) include those groups that correspond to the above-described alkyl groups, such as methoxy, ethoxy, propoxy, isopropoxy, butoxy, octoxy and 2-ethylhexyloxy.

Still further, examples of the hydroxyalkoxy group having 1 to 30 carbon atoms that may be represented by the $R^1$ in the above-described Formula (1) include those groups that correspond to the above-described alkoxy groups, such as hydroxyethyloxy, 2-hydroxypropyloxy, 3-hydroxypropyloxy, 4-hydroxybutyloxy, 2-hydroxy-2-methylpropyloxy and 6-hydroxyhexyloxy.

Still further, examples of the alkenyl group having 2 to 30 carbon atoms that may be represented by the $R^2$ in the above-described Formula (1) include vinyl, propenyl, butenyl, hexenyl and oleyl. The double bond may be located at the α-position, internally, or at the ω-position.

More specific examples of the compound represented by the above-described Formula (1) include the following Compound Nos. 1 to 6. It is noted here, however, that the present invention is not restricted thereto by any means.

Compound No. 1 (melting point: 46° C.)

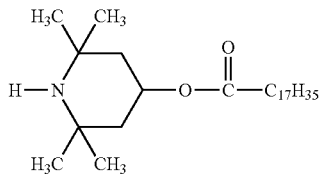

Compound No. 2 (melting point: 37° C.)

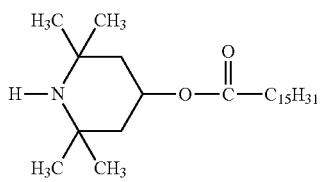

Compound No. 3 (melting point: 48° C.)

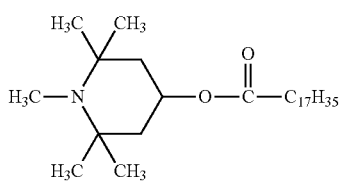

Compound No. 4 (liquid at normal temperature)

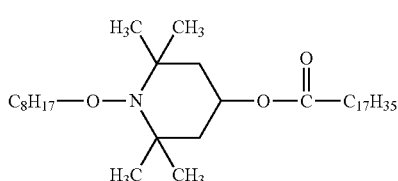

Compound No. 5 (liquid at normal temperature)

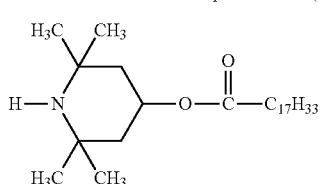

Compound No. 6 (melting point: 63° C.)

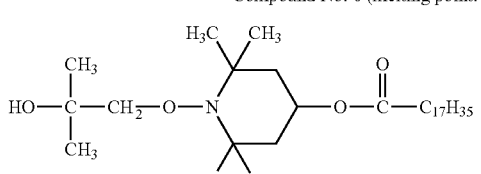

Among those compounds that are represented by the above-described Formula (1), compounds other than the Compound No. 6 have a melting point of 60° C. or lower and are thus particularly preferred.

The method of synthesizing these compounds represented by the Formula (1) is not particularly restricted, and they can be synthesized by a method that is used in ordinary organic synthesis. Examples of such method include direct esterification between an acid and an alcohol, and esterification such as a reaction between an acid halide and an alcohol, and a transesterification reaction. As a purification method, for example, distillation, recrystallization, reprecipitation or a method utilizing a filtering agent and/or an absorbent can be employed as appropriate.

It is preferred that the (B) resin additive having a melting point of not higher than 80° C. comprise at least one of the above-described hindered amine compounds (particularly preferably a compound(s) represented by the above-described Formula (1)) and a benzoate compound represented by the following Formula (4). It is also preferred that the content ratio of the above-described hindered amine compound(s) and the above-described benzoate compound be 1:1 to 4:1 in terms of mass ratio.

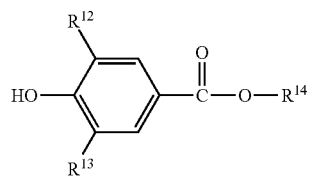

(4)

(wherein, $R^{12}$ and $R^{13}$ each independently represent a hydrogen atom, an alkyl group having 1 to 12 carbon atoms or an arylalkyl group having 7 to 30 carbon atoms; and $R^{14}$ represents an alkyl group having 1 to 30 carbon atoms)

Examples of the alkyl group having 1 to 12 carbon atoms that may be represented by the $R^{12}$ and $R^{13}$ in the Formula (4) include methyl, ethyl, propyl, isopropyl, butyl, sec-butyl, tert-butyl, pentyl, hexyl, octyl and cycloalkyl groups such as cyclopentyl and cyclohexyl, and examples of the arylalkyl group having 7 to 30 carbon atoms include benzyl, phenylethyl and 1-methyl-1-phenylethyl.

Examples of the alkyl group having 1 to 30 carbon atoms that may be represented by the $R^{14}$ include methyl, ethyl, propyl, isopropyl, butyl, sec-butyl, tert-butyl, pentyl, hexyl, octyl, nonyl, decyl, undecyl, dodecyl, tridecyl, tetradecyl, pentadecyl, hexadecyl and octadecyl.

More specific examples of the compound represented by the above-described Formula (4) include the following Compound Nos. 30 to 33. It is noted here, however, that the present invention is not restricted thereto by any means.

Compound No. 30 (melting point: 62° C.)

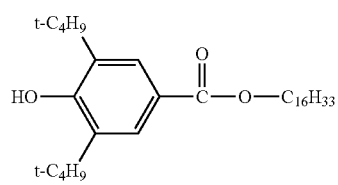

Compound No. 31 (melting point: 55° C.)

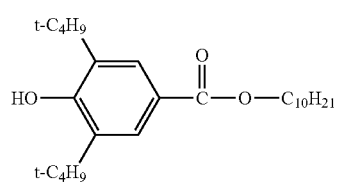

-continued

Compound No. 32 (melting point: 69° C.)

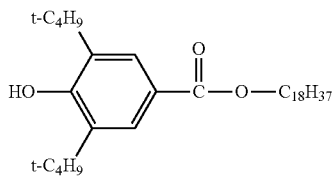

Compound No. 33 (melting point: 67° C.)

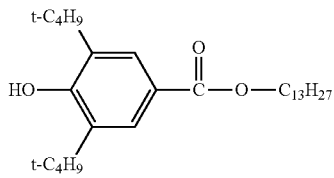

The resin additive masterbatch of the present invention comprises the above-described (B) resin additive in an amount of 65 to 300 parts by mass, preferably 100 to 300 parts by mass, with respect to 100 parts by mass of the (A) polyolefin resin. When the amount of the (B) resin additive is less than 65 parts by mass, the masterbatch has to be added in a large amount and the merits of using a high-concentration masterbatch are thus diminished, while when the amount of the (B) resin additive is greater than 300 parts by mass, the additive is more likely to bleed out, which causes agglomeration of the resulting pellet and reduction in the storage stability.

Examples of the (C) benzotriazole-based ultraviolet absorber used in the present invention include 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis[4-(1,1,3,3-tetramethylbutyl)-6-benzotriazole-2-yl-phenol],
polyethylene glycol ester of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole and 2-[2-hydroxy-4-(3-methacryloyloxypropyl)phenyl]benzotriazole.

From the standpoint of the storage stability (agglomeration resistance) of the resulting pellet, the (C) benzotriazole-based ultraviolet absorber is preferably a compound represented by the following Formula (2) or (5):

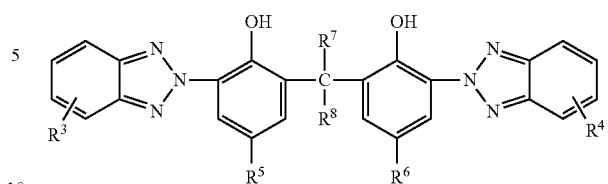

(wherein, $R^3$ and $R^4$ each independently represent a hydrogen atom, a chlorine atom or an alkyl group having 1 to 4 carbon atoms; $R^5$ and $R^6$ each independently represent a hydrogen atom or an alkyl group having 1 to 18 carbon atoms; and $R^7$ and $R^8$ each independently represent a hydrogen atom or an alkyl group having 1 to 4 carbon atoms); or

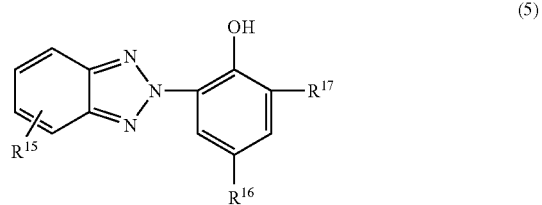

(wherein, $R^{15}$ represents a hydrogen atom, a chlorine atom or an alkyl group having 1 to 4 carbon atoms; and $R^{16}$ and $R^{17}$ each independently represent a hydrogen atom, an alkyl group having 1 to 18 carbon atoms or an aralkyl group having 7 to 18 carbon atoms).

Examples of the alkyl group having 1 to 4 carbon atoms that is represented by the $R^3$, $R^4$, $R^7$ and $R^8$ in the Formula (2) include methyl, ethyl, propyl, isopropyl, butyl, sec-butyl and tert-butyl.

Further, examples of the alkyl group having 1 to 18 carbon atoms that is represented by the $R^5$ and $R^6$ in the Formula (2) include methyl, ethyl, propyl, isopropyl, butyl, sec-butyl, tert-butyl, pentyl, sec-pentyl, tert-pentyl, hexyl, heptyl, octyl, isooctyl, 2-ethylhexyl, tert-octyl, nonyl, isononyl, decyl, undecyl, dodecyl, tridecyl, tetradecyl, pentadecyl, hexadecyl, heptadecyl and octadecyl.

More specific examples of the compound represented by the above-described Formula (2) include the following Compound Nos. 7 to 11. It is noted here, however, that the present invention is not restricted thereto by any means.

Compound No. 7

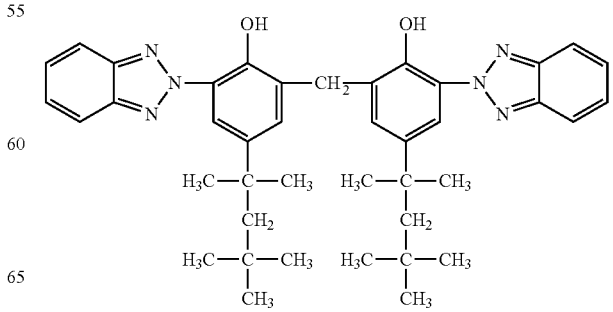

-continued

Compound No. 8

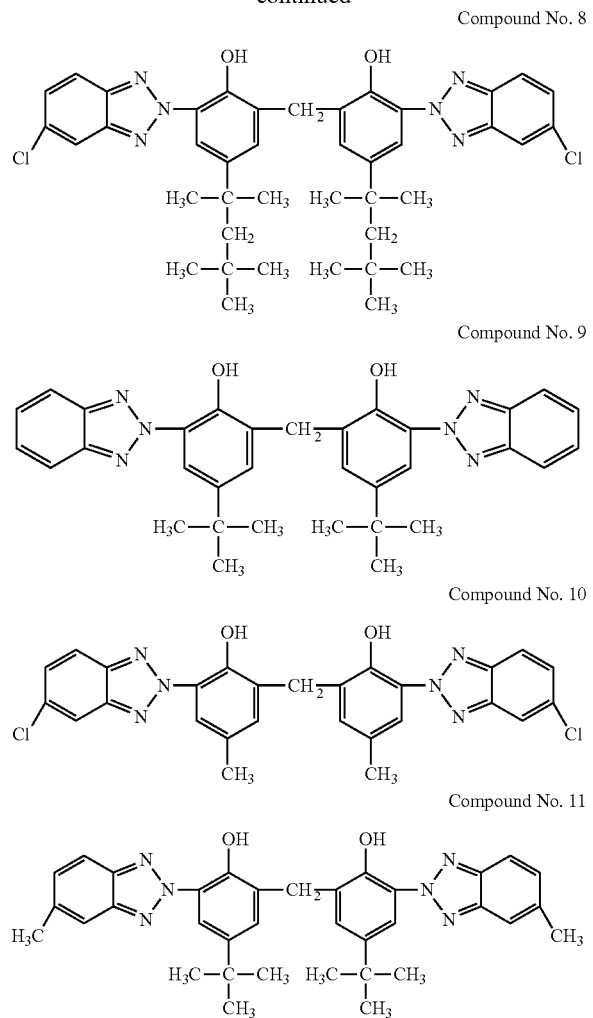

Compound No. 9

Compound No. 10

Compound No. 11

Among those compounds that are represented by the above-described Formula (2), from the standpoint of the storage stability (agglomeration resistance) of the masterbatch, Compound No. 7 is particularly preferred.

In the above-described Formula (5), examples of the alkyl group having 1 to 4 carbon atoms that may be represented by the $R^{15}$ and examples of the alkyl group having 1 to 18 carbon atoms that may be represented by the $R^{16}$ and $R^{17}$ include the same ones as those described above. The aralkyl group having 7 to 18 carbon atoms that may be represented by the $R^{16}$ and $R^{17}$ is one of the above-described alkyl groups whose hydrogen atom(s) is/are substituted with an aryl group such as a phenyl group, and examples thereof include an α,α-dimethylbenzyl group.

Examples of the compound represented by the above-described Formula (5) include 2-(2-hydroxy-5-methylphenyl)benzotriazole, 2,4-bis(α,α-dimethylbenzyl)-6-(2H-benzotriazole-2-yl)phenol, 2-(5-chloro-2H-benzotriazole-2-yl)-4-methyl-6-tert-butylphenol, 4,6-bis(1,1-dimethylpropyl)-2-(2H-benzotriazole-2-yl)phenol and 2-(2-hydroxy-5-tert-octylphenyl)-2H-benzotriazole. Among them, from the standpoint of the storage stability (agglomeration resistance) of the resulting pellet, 2-(2-hydroxy-5-methylphenyl)benzotriazole is preferred.

The above-described (C) benzotriazole-based ultraviolet absorber is incorporated in an amount of 0.8 to 24 parts by mass, preferably 1.0 to 24 parts by mass, with respect to 100 parts by mass of the (A) polyolefin resin. When the amount of the (C) benzotriazole-based ultraviolet absorber is less than 0.8 parts by mass, agglomeration of the resulting pellet occurs and the storage stability is consequently reduced, while when the amount is greater than 24 parts by mass, the melt viscosity is reduced, which may make pelletization of the resulting masterbatch difficult.

It is also preferred that the resin additive masterbatch of the present invention further comprise at least one (D) metal aromatic phosphate represented by the following Formula (3) in an amount of 0.3 to 5 parts by mass with respect to 100 parts by mass of the (A) polyolefin resin:

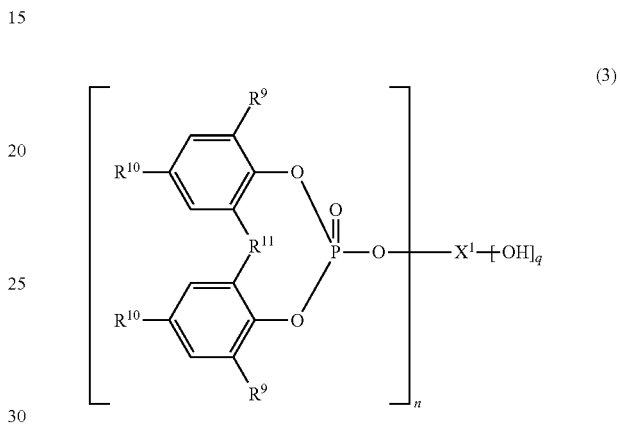

(3)

(wherein, $R^9$ represents an alkyl group having 4 to 8 carbon atoms; $R^{10}$ represents a hydrogen atom or an alkyl group having 1 to 8 carbon atoms; $R^{11}$ represents an alkylidene group having 1 to 4 carbon atoms; and $X^1$ represents an alkali metal atom, an alkaline earth metal atom or an aluminum atom, with provisos that: when $X^1$ is an alkali metal atom, n is 1 and q is 0; when $X^1$ is an alkaline earth metal atom, n is 2 and q is 0; and when $X^1$ is an aluminum atom, n is 1 or 2 and q is (3−n)).

Examples of the alkyl group having 4 to 8 carbon atoms that is represented by the $R^9$ in the Formula (3) include butyl, sec-butyl, tert-butyl, pentyl, tert-pentyl, hexyl, cyclohexyl, heptyl, octyl, isooctyl and tert-octyl.

Examples of the alkyl group having 1 to 8 carbon atoms that is represented by the $R^{10}$ include methyl, ethyl, propyl, isopropyl, butyl, sec-butyl, tert-butyl, pentyl, tert-pentyl, hexyl, cyclohexyl, heptyl, octyl, isooctyl and tert-octyl.

Examples of the alkylidene group having 1 to 4 carbon atoms that is represented by the $R^{11}$ include methylene, ethylidene, 1,1-propylidene, 2,2-propylidene and butylidene.

Examples of the metal represented by the $X^1$ include alkali metals such as lithium, sodium and potassium; alkaline earth metals such as magnesium and calcium; and aluminum. Among them, alkali metals are preferred.

More specific examples of the compound represented by the above-described Formula (3) include the following Compound Nos. 12 to 29. It is noted here, however, that the present invention is not restricted thereto by any means.

Compound No. 12
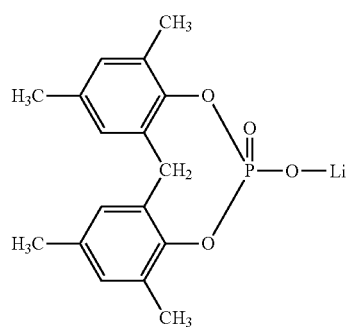
Compound No. 16
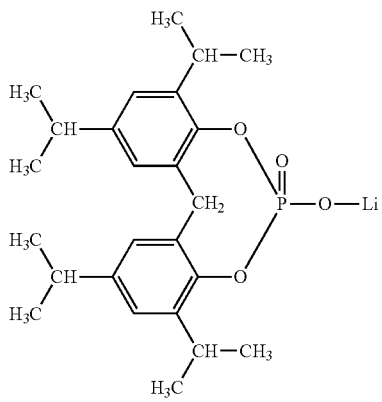
Compound No. 13
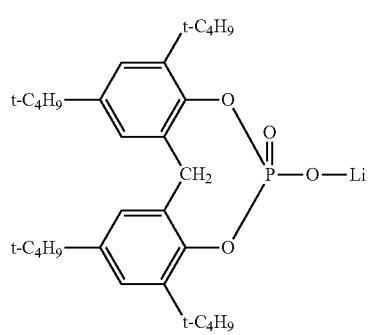
Compound No. 17
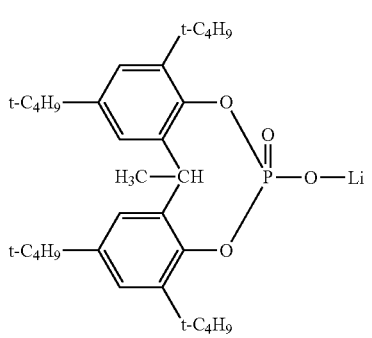
Compound No. 14
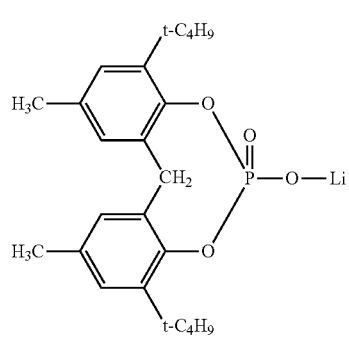
Compound No. 18
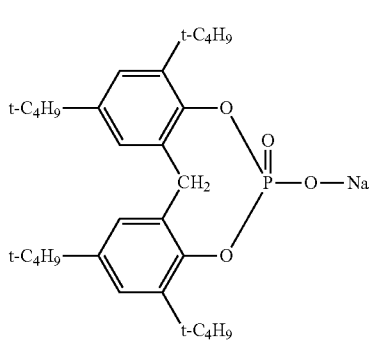
Compound No. 15
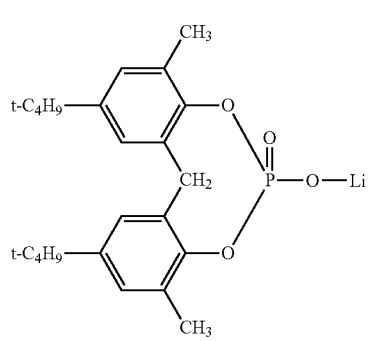
Compound No. 19
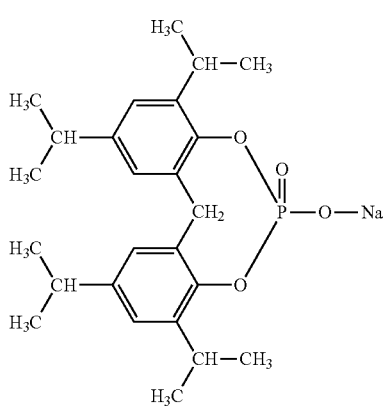

Compound No. 20
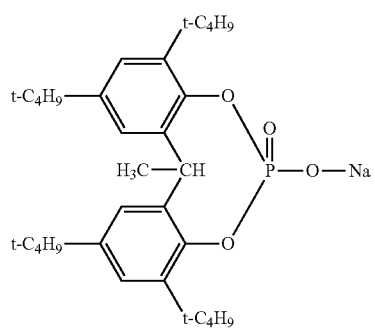
Compound No. 21
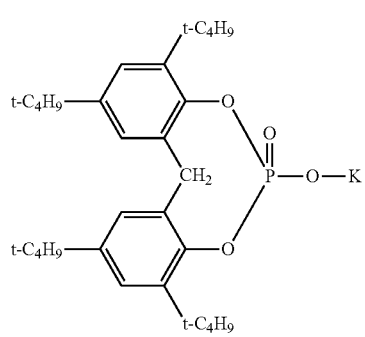
Compound No. 22
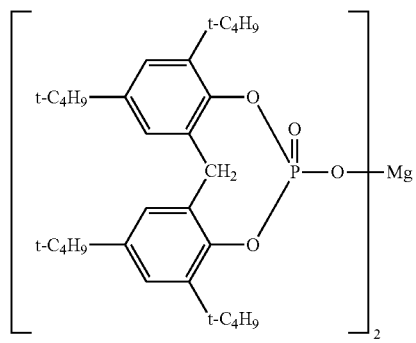
Compound No. 23
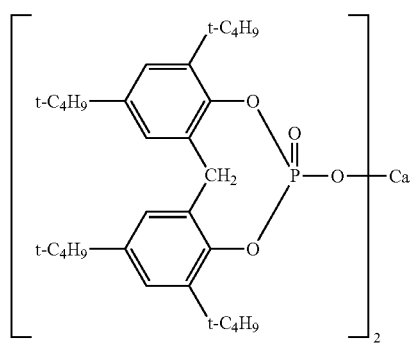
Compound No. 24
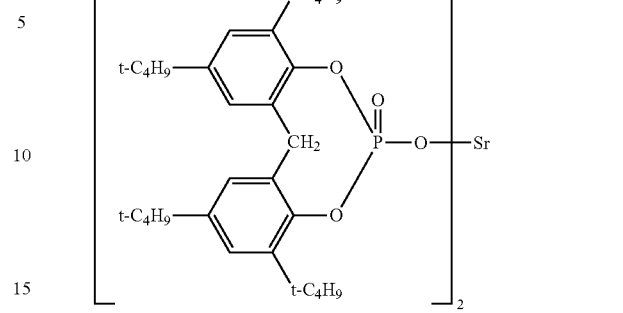
Compound No. 25
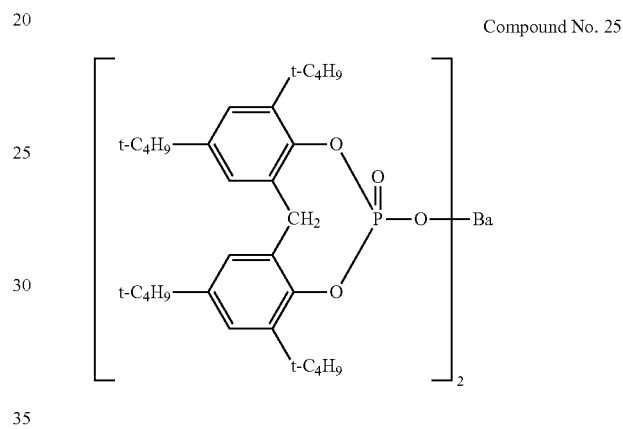
Compound No. 26
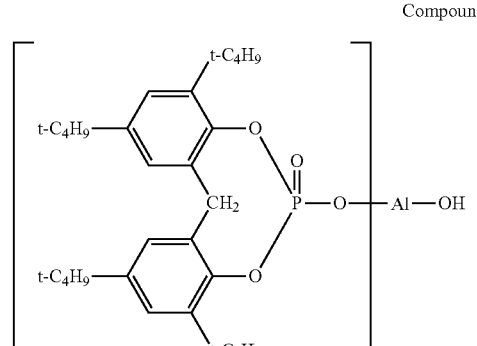
Compound No. 27
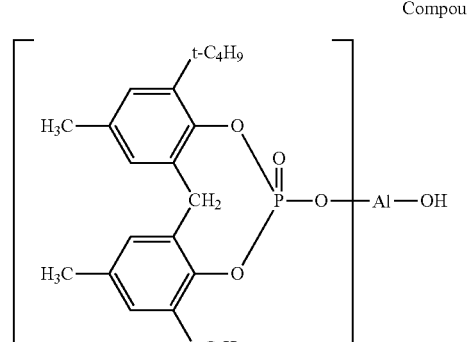

-continued

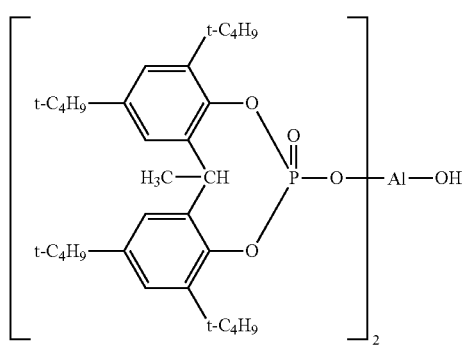

Compound No. 28

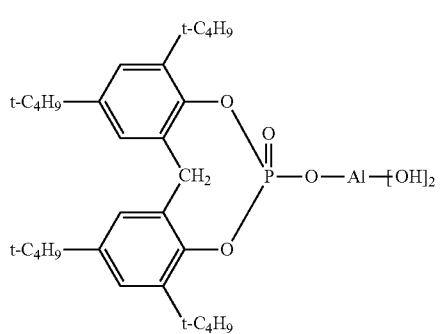

Compound No. 29

In cases where the above-described (D) metal aromatic phosphate represented by the Formula (3) is incorporated, the amount thereof is preferably 0.3 to 5 parts by mass with respect to 100 parts by mass of the (A) polyolefin resin. When the amount of the (D) metal aromatic phosphate is less than 0.3 parts by mass, the effect thereof may not be sufficiently exerted, while when the amount is greater than 5 parts by mass, the (D) metal aromatic phosphate affects the crystallinity and the like of a resin to which the masterbatch is added and the physical properties of the resin are consequently impaired.

The method of producing the resin additive masterbatch of the present invention is not particularly restricted, and the resin additive masterbatch of the present invention can be produced by a conventionally-known method. For example, after dry-blending the components to be incorporated, the resultant may be mixed using a Henschel mixer, a mill roll, a Banbury mixer, a super mixer or the like, kneaded using an uniaxial or biaxial extruder or the like, and then made into a pellet.

The resin to be stabilized by the resin additive masterbatch of the present invention may be of any type, such as a thermoplastic resin, a thermosetting resin, a crystalline resin, a non-crystalline resin, a biodegradable resin, a non-biodegradable resin, a synthetic resin, a natural resin, a general-purpose resin, an engineering resin or a polymer alloy.

The synthetic resin may be, for example, a thermoplastic resin such as polypropylene, low-density polyethylene, linear low-density polyethylene, high-density polyethylene, polybutene-1, poly-3-methylpentene, poly-4-methylpentene, an α-olefin homopolymer or copolymer (e.g., an ethylene-propylene copolymer), a polyunsaturated compound of these α-olefins and conjugated diene, unconjugated diene or the like, a copolymer with acrylic acid, methacrylic acid, vinyl acetate or the like, a linear polyester or acid-modified polyester (e.g., polyethylene terephthalate, polyethylene terephthalate-isophthalate, polyethylene terephthalate-paraoxybenzoate, or polybutylene terephthalate), a biodegradable resin (e.g., aliphatic polyester), liquid-crystal polyester, polyamide (e.g., polycaprolactam or polyhexamethylene adipamide), liquid-crystal polyamide, polyimide, polystyrene, a copolymer (e.g., acrylonitrile-styrene copolymer (AS) resin, acrylonitrile-butadiene-styrene copolymer (ABS) resin, methyl methacrylate-butadiene-styrene copolymer (MBS) resin or heat-resistant ABS resin) composed of styrene and/or α-methylstyrene with other monomer (e.g., maleic anhydride, phenyl maleimide, methyl methacrylate, butadiene or acrylonitrile), a halogen-containing resin (e.g., polyvinyl chloride, polyvinylidene chloride, chlorinated polyethylene, chlorinated polypropylene, polyvinylidene fluoride, chlorinated rubber, vinyl chloride-vinyl acetate copolymer, vinyl chloride-ethylene copolymer, vinyl chloride-vinylidene chloride copolymer, vinyl chloride-vinylidene chloride-vinyl acetate ternary copolymer, vinyl chloride-acrylate copolymer, vinyl chloride-maleate copolymer or vinyl chloride-cyclohexylmaleimide copolymer), a (meth)acrylate polymer (e.g., methyl (meth)acrylate, ethyl (meth)acrylate or octyl (meth)acrylate), polyether ketone, polyvinyl acetate, polyvinyl formal, polyvinyl butyral, polyvinyl alcohol, linear or branched polycarbonate, a petroleum resin, a coumarone resin, polyphenylene oxide, polyphenylene sulfide, thermoplastic polyurethane or a cellulose-based resin; a thermosetting resin such as an epoxy resin, a phenol resin, a urea resin, a melamine resin, an unsaturated polyester resin or thermosetting polyurethane; an elastomer (e.g., an isoprene rubber, a butadiene rubber, a butadiene-styrene copolymer rubber, a butadiene-acrylonitrile copolymer rubber, an acrylonitrile-butadiene-styrene copolymer rubber, a copolymer rubber of ethylene and α-olefin such as propylene or butene-1, or a ternary copolymer rubber of ethylene-α olefin and a non-conjugated diene such as ethylidene norbornene or cyclopentadiene); or a silicon resin. The synthetic resin may also be an alloy or blend of any of these resins and/or an elastomer(s). Among them, a polyolefin resin is preferred.

Examples of the natural resin include natural rubbers, microorganism-produced aliphatic polyesters such as 3-hydroxybutyrate, microorganism-produced aliphatic polyamides, starch, cellulose, chitin/chitosan, and gluten/gelatin.

The expression of the stabilization effect of the above-described resins are variable depending on, for example, stereoregularity, specific gravity, the type of the polymerization catalyst, the presence/absence and the degree of removal of the polymerization catalyst, the degree of crystallization, the polymerization conditions such as temperature and pressure, the type of crystal, the size of lamella crystal measured by X-ray small-angle scattering, the aspect ratio of the crystal, the solubility in an aromatic or aliphatic solvent, the solution viscosity, the melt viscosity, the average molecular weight, the degree of molecular weight distribution, the number of peaks in the molecular weight distribution, whether the copolymer is a block or random copolymer, and the blending ratio of each monomer. However, the resin additive masterbatch of the present invention can be applied to any of the above-described resins.

The method of blending the resin additive masterbatch of the present invention into a resin is not particularly restricted and any known technology for blending a stabilizer into a resin can be employed. For example, a method in which a masterbatch is mixed with resin powder or pellet using a Henschel mixer or the like and the resulting mixture is then kneaded using an extruder or the like can be employed. The types of the processing machines, the processing temperature, the post-processing cooling conditions and the like are also not particularly restricted, and it is preferred to select such conditions that allow the resulting resin to have physical properties suitable for its intended use.

The mass ratio at which the resin additive masterbatch of the present invention is blended into a resin is dependent on, for example, the concentration of the resin additive in the masterbatch and the final concentration of the resin additive in the resin composition in which the masterbatch is blended; however, the masterbatch is blended in an amount of preferably 0.01 to 20 parts by mass, more preferably 0.05 to 10 parts by mass, with respect to 100 parts by mass of the resin.

In cases where the resin additive masterbatch of the present invention is used for stabilization of a resin, a variety of formulation agents that are generally used in various resins are used as required. These formulation agents may be the same as or different from the above-described (B) resin additive, (C) benzotriazole-based ultraviolet absorber and (C) metal aromatic phosphate that are used in the resin additive masterbatch of the present invention. Examples of such formulation agents include phenolic antioxidants, sulfur-based antioxidants, phosphorus-based antioxidants, ultraviolet absorbers, hindered amine compounds, nucleating agents, flame retardants, flame retardant aids, lubricants, fillers, fibrous fillers, metallic soaps, hydrotalcites, antistatic agents, pigments and dyes. These formulation agents may be blended together with the resin additive masterbatch of the present invention, or they may be blended separately. Alternatively, as long as the storage stability of the resin additive masterbatch of the present invention is not affected, the formulation agents may be incorporated into the masterbatch to be blended.

Examples of the above-described phenolic antioxidants include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylenebis[(3,5-di-tert-butyl-4-hydroxyphenyl)propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3,5-di-tert-butyl-4-hydroxyphenyl)propionate, thiodiethylene glycol-bis[(3,5-di-tert-butyl-4-hydroxyphenyl)propionate], 1,6-hexamethylenebis[(3,5-di-tert-butyl-4-hydroxyphenyl)propionate], bis[3,3-bis(4-hydroxy-3-tert-butylphenyl)butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5.5]undecane and triethylene glycol-bis[(3-tert-butyl-4-hydroxy-5-methylphenyl)propionate]. The amount of the phenolic antioxidant(s) to be blended is preferably 0.001 to 10 parts by weight, more preferably 0.01 to 5 parts by weight, with respect to 100 parts by weight of a resin.

Examples of the above-described sulfur-based antioxidants include dialkyl thiodipropionates such as dilauryl thiodipropionate, dimyristyl thiodipropionate and distearyl thiodipropionate; and β-alkylmercaptopropionates of polyols such as pentaerythritol tetrakis(β-dodecylthiopropionate). The amount of the sulfur-based antioxidant(s) to be blended is preferably 0.001 to 10 parts by weight, more preferably 0.01 to 5 parts by weight, with respect to 100 parts by weight of a resin.

Examples of the above-described phosphorus-based antioxidants include trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl)isopropylidene diphenol diphosphite, tetra(tridecyl)-4,4'-n-butylidenebis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylenebis(4,6-di-tert-butylphenyl)-2-ethylhexyl phosphite, 2,2'-methylenebis(4,6-di-tert-butylphenyl)-octadecyl phosphite, 2,2'-ethylidenebis(4,6-di-tert-butylphenyl) fluorophosphite, tris(2-[(2,4,8,10-tetrakis-tert-butyldibenzo[d,f][1,3,2]dioxaphosphepine-6-yl)oxy]ethyl)amine, and phosphites of 2-ethyl-2-butylpropylene glycol and 2,4,6-tri-tert-butylphenol. The amount of the phosphorus-based antioxidant(s) to be blended is preferably 0.001 to 10 parts by weight, more preferably 0.01 to 5 parts by weight, with respect to 100 parts by weight of a resin.

Examples of the above-described ultraviolet absorbers include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2'-hydroxyphenyl)benzotriazoles such as 2-(2'-hydroxy-5'-methylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole and 2-(2'-hydroxy-3'-tert-butyl-5'-carboxyphenyl)benzotriazole; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; and triaryl triazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine and 2-(2-hydroxy-4-propoxy-5-methylphenyl)-4,6-bis(2,4-di-tert-butylphenyl)-s-triazine. The amount of the ultraviolet absorber(s) to be blended is preferably 0.001 to 10 parts by weight, more preferably 0.01 to 5 parts by weight, with respect to 100 parts by weight of a resin.

Examples of the above-described other hindered amine compounds include 2,2,6,6-tetramethyl-4-piperidyl stearate, 1,2,2,6,6-pentamethyl-4-piperidyl stearate, 2,2,6,6-tetramethyl-4-piperidylbenzoate, bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl)butane tetracarboxylate, tetrakis(1,2,2,6,6-pentamethyl-4-piperidyl)butane tetracarboxylate, bis(2,2,6,6-tetramethyl-4-piperidyl)·di(tridecyl)-1,2,3,4-butane tetracarboxylate, bis(1,2,2,6,6-pentamethyl-4-piperidyl)·di(tridecyl)-1,2,3,4-butane tetracarboxylate, bis(1,2,2,6,6-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylaminoundecane and 1,6,11-tris[2,4-bis(N-butyl-N-(1,2,2,6,6-pentamethyl-4-piperidyl)amino)-s-triazine-6-ylaminoundecane. The amount of the hindered amine compound(s) to be blended is preferably 0.001 to 10 parts by weight, more preferably 0.01 to 5 parts by weight, with respect to 100 parts by weight of a resin.

Examples of the above-described nucleating agents include metal salts of aromatic carboxylic acids, such as aluminum p-t-butyl benzoate and sodium benzoate; metal salts of alicyclic carboxylic acids, such as disodium-bicyclo(2,2,1)heptane-2,3-dicarboxylate; acidic metal phosphates such as sodium-bis(2,4-di-tert-butylphenyl)phosphate, lithium-bis(2,4-di-tert-butylphenyl)phosphate and sodium-2,2'-methylenebis(4,6-di-tert-butylphenyl)phosphate; and polyhydric alcohol derivatives such as dibenzylidene sorbitol and bis(methylbenzylidene)sorbitol.

Examples of the above-described flame retardants include halogen-based flame retardants; phosphorus-based flame retardants such as red phosphorus, melamine phosphate, ammonium polyphosphate, melamine polyphosphate, melamine pyrophosphate, piperazine polyphosphate, piperazine pyrophosphate, guanidine phosphate, phosphate compounds and phosphazene compounds; nitrogen-based flame retardants such as melamine cyanurate; and metal hydroxides such as magnesium hydroxide and aluminum hydroxide. Examples of the above-described flame retardant aids include inorganic compounds such as antimony trioxide and zinc borate; and anti-dripping agents such as polytetrafluoroethylenes.

The above-described hydrotalcites may each be either a natural or synthetic product and may be used regardless of the presence or absence of surface treatment and crystal water. Examples of such hydrotalcites include basic carbonates represented by the following Formula:

$$M_xMg_yAl_zCO_3(OH)_{xp+2y+3z-2}\cdot nH_2O$$

(wherein, M represents an alkali metal or zinc; x represents a number of 0 to 6; y represents a number of 0 to 6; z represents a number of 0.1 to 4; p represents the valency of M; and n represents the number of crystal water in the range of 0 to 100).

Examples of the above-described lubricants include fatty acid amides such as lauryl amide, myristyl amide, stearyl amide and behenyl amide; ethylene-bis stearyl amide; polyethylene wax; metallic soaps such as calcium stearate and magnesium stearate; and metal phosphates such as magnesium distearyl phosphate and magnesium stearyl phosphate.

As a filler, an inorganic substance such as talc, silica, calcium carbonate, glass fiber, potassium titanate or potassium borate is employed by appropriately selecting the particle size in the case of a spherical filler, or the fiber diameter, fiber length and aspect ratio in the case of a fibrous filler. Further, it is preferred that the filler be subjected to a surface treatment as required.

Examples of the above-described antistatic agents include cationic antistatic agents such as fatty acid quaternary ammonium ion salts and polyamine quaternary salts; anionic antistatic agents such as higher alcohol phosphates, higher alcohol EO adducts, polyethylene glycol fatty acid esters, anionic alkyl sulfonates, higher alcohol sulfates, higher alcohol ethylene oxide adduct sulfates and higher alcohol ethylene oxide adduct phosphates; nonionic antistatic agents such as polyhydric alcohol fatty acid esters, polyglycol phosphates and polyoxyethylene alkyl allyl ethers; and amphoteric antistatic agents such as amphoteric alkyl betaines (e.g., alkyldimethylamino acetic acid betaine) and imidazoline-type amphoteric activators. These antistatic agents may be used individually, or two or more thereof may be used in combination.

Further, in cases where the resin additive masterbatch of the present invention is used in an agricultural film, an ultraviolet absorber may be blended so as to control the crop growth; an infrared absorber may be blended so as to improve the heat-retaining properties; and/or an anti-clouding agent or an anti-fogging agent may be blended because fogging may occur inside the greenhouse or dew condensation may occur on the film surface to prevent sufficient amount of light from reaching the crops.

Further, the polyolefin resin composition of the present invention in which the resin additive masterbatch of the present invention is added can be used in a variety of applications, for example, automobile resin components such as bumpers, dash boards and instrument panels; resin parts for home electric appliances such as refrigerators, laundry machines and cleaners; household articles such as tablewares, buckets and bath goods; resin parts for connection, such as connectors; miscellaneous goods such as toys; storage containers such as tanks and bottles; medical molded articles such as medical packages, syringes, catheters and medical tubes; building materials such as wall materials, flooring materials, window frames and wall papers; wire coating materials; agricultural materials such as greenhouses and tunnels; molded articles including films and sheets, such as food packaging materials (e.g., wraps and trays); and fibers.

EXAMPLES

The present invention will now be described in more detail by way of examples thereof. However, the present invention is not restricted by the following examples by any means.

Examples 1 to 32

Comparative Examples 1 to 21

To 100 parts by mass of polypropylene (NOVATEC MA3, manufactured by Japan Polypropylene Corporation: component (A)), a mixture of the below-described Compound No. 1 and Compound No. 2, both of which are resin additives (manufactured by ADEKA Corporation, trade name: ADK STAB LA-40, melting point: 33° C.), and the below-described Compound No. 30 (melting point: 62° C.) were added as component (B), and 2-(2-hydroxy-5-methylphenyl)benzotriazole (manufactured by ADEKA Corporation, trade name: ADK STAB LA-32) or Compound No. 7

(manufactured by ADEKA Corporation, trade name: ADK STAB LA-31) and Compound No. 18 were added as (C) benzotriazole-based ultraviolet absorber and (D) metal aromatic phosphate represented by the above-described Formula (3), respectively, in the respective amounts shown in the tables below. The resulting mixtures were each stirred for 30 minutes using a rocking mixer. Then, using a biaxial extruder manufactured by The Japan Steel Works, LTD. (TEX 30α), the resulting powders were each granulated at a temperature of 270° C., a die temperature of 160° C. and at a rate of 15 kg/hour, thereby obtaining pellets.

The thus obtained pellets were subjected to a storage stability test (agglomeration resistance test) under the below-described conditions. The results thereof are shown in Table 1.

Pellets that were used as Comparative Examples were prepared in the same manner, except that the amount of the component (C) was changed, or 2-hydroxy-4-n-octoxybenzophenone (manufactured by ADEKA Corporation, trade name: ADK STAB 1413) which is a benzophenone-based ultraviolet absorber, tris(2,4-di-tert-butylphenyl)phosphite (manufactured by ADEKA Corporation, trade name: ADK STAB 2112) which is a phosphorus-based antioxidant or talc which is a filler was used in place of the component (C). The thus obtained pellets were subjected to a storage stability test (agglomeration resistance test) under the below-described conditions. The results thereof are shown in Tables 1 to 6.

In Comparative Examples 3 and 5, the melt viscosity was reduced, so that a pellet could not be prepared.

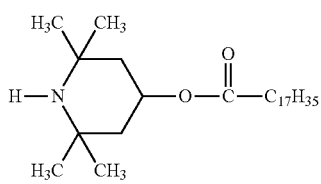

Compound No. 1 (melting point: 46° C.)

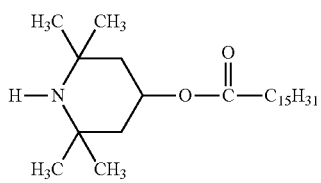

Compound No. 2 (melting point: 37° C.)

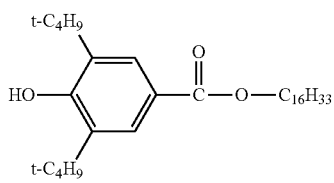

Compound No. 30 (melting point: 62° C.)

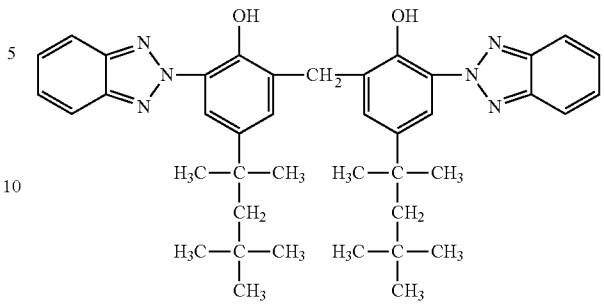

Compound No. 7

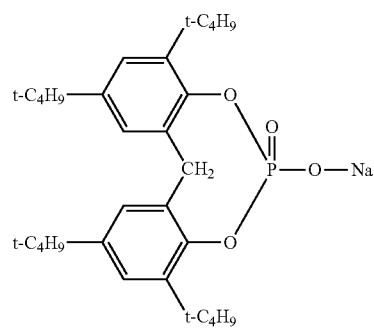

Compound No. 18

<Storage Stability Test (Agglomeration Resistance Test)>

In a glass sample vial having a base area of 12.6 cm², a height of 6 cm and a volume of 75 ml, 20 g of each of the thus obtained pellets was placed and stored in a 50° C. or 60° C. incubator. After one-week of storage, the sample vial was inverted and the agglomeration resistance was evaluated based on the falling condition of the pellet. The evaluation criteria were as follows. The level 1 stands for the most excellent agglomeration resistance, followed by the levels 2, 3 and 4 with the level 5 being an evaluation given to the poorest agglomeration resistance.

Level 1: The pellet fell out of the sample vial when the sample vial was gently inverted.

Level 2: The pellet did not fall out of the sample vial under the condition of Level 1; however, when vibration was given to the inverted sample vial by dropping it onto a flat bench from a height of 5 mm, the pellet fell out.

Level 3: The pellet did not fall out of the sample vial under the condition of Level 2; however, when vibration was given to the inverted sample vial by dropping it onto a flat bench from a height of 30 mm, the pellet fell out.

Level 4: The pellet did not fall out of the sample vial under the condition of Level 3; however, when the bottom of the sample vial was tapped several times, the pellet fell out.

Level 5: The pellet did not fall out of the sample vial even under the condition of Level 4.

TABLE 1

|  |  | Example |  |  |  |  |  |  |  |  |  |  |  |
|---|---|---|---|---|---|---|---|---|---|---|---|---|---|
|  |  | 1 | 2 | 3 | 4 | 5 | 6 | 7 | 8 | 9 | 10 | 11 | 12 |
| Component (A) | Polypropylene*1 | 100 | 100 | 100 | 100 | 100 | 100 | 100 | 100 | 100 | 100 | 100 | 100 |
| Component (B) | ADK STAB LA-40*2 | 100 | 100 | 100 | 100 | 100 | 100 | 150 | 150 | 150 | 150 | 150 | 150 |
|  | Compound No. 30*3 | — | — | — | — | — | — | — | — | — | — | — | — |
| Component (C) | Benzotriazole-based ultraviolet absorber*4 | 1.6 | 3.0 | 4.0 | — | — | — | 3.0 | 8.0 | 12.0 | — | — | — |
|  | Compound No. 7*5 | — | — | — | 1.6 | 3.0 | 4.0 | — | — | — | 3.0 | 8.0 | 12.0 |
| Component (D) | Compound No. 18*6 | 1.2 | 1.2 | 1.2 | 1.2 | 1.2 | 1.2 | 1.2 | 1.2 | 1.2 | 1.2 | 1.2 | 1.2 |
| Benzophenone-based ultraviolet absorber*7 |  | — | — | — | — | — | — | — | — | — | — | — | — |
| Phosphorus-based antioxidant*8 |  | — | — | — | — | — | — | — | — | — | — | — | — |
| Talc |  | — | — | — | — | — | — | — | — | — | — | — | — |
| Storage stability (agglomeration resistance) level | 50° C. | 1 | 1 | 1 | 1 | 1 | 1 | 2 | 2 | 1 | 1 | 1 | 1 |
|  | 60° C. | 1 | 1 | 1 | 1 | 1 | 1 | 2 | 2 | 2 | 2 | 1 | 1 |

*1 NOVATEC MA3, manufactured by Japan Polypropylene Corporation
*2 Mixture of Compound No. 1 and Compound No. 2 (manufactured by ADEKA Corporation, melting point: 33° C.)
*3 Hexadecyl-3,5-di-tert-butyl-4-hydroxybenzoate, melting point: 62° C.
*4 2-(2-hydroxy-5-methylphenyl)benzotriazole (manufactured by ADEKA Corporation, trade name: ADK STAB LA-32)
*5 manufactured by ADEKA Corporation, trade name: ADK STAB LA-31
*6 manufactured by ADEKA Corporation, trade name: ADK STAB NA-11
*7 2-hydroxy-4-n-octoxybenzophenone (manufactured by ADEKA Corporation, trade name: ADK STAB 1413)
*8 Tris(2,4-di-tert-butylphenyl)phosphite (manufactured by ADEKA Corporation, trade name: ADK STAB 2112)

TABLE 2

|  |  | Example |  |  |  |  |  |  |  |  |  |
|---|---|---|---|---|---|---|---|---|---|---|---|
|  |  | 13 | 14 | 15 | 16 | 17 | 18 | 19 | 20 | 21 | 22 |
| Component (A) | Polypropylene*1 | 100 | 100 | 100 | 100 | 100 | 100 | 100 | 100 | 100 | 100 |
| Component (B) | ADK STAB LA-40*2 | 200 | 200 | 200 | 200 | 250 | 250 | 250 | 250 | 300 | 300 |
|  | Compound No. 30*3 | — | — | — | — | — | — | — | — | — | — |
| Component (C) | Benzotriazole-based ultraviolet absorber*4 | 8.0 | 12.0 | — | — | 10.0 | 20.0 | — | — | 24.0 | — |
|  | Compound No. 7*5 | — | — | 8.0 | 12.0 | — | — | 10.0 | 20.0 | — | 24.0 |
| Component (D) | Compound No. 18*6 | 1.2 | 1.2 | 1.2 | 1.2 | 1.2 | 1.2 | 1.2 | 1.2 | 1.2 | 1.2 |
| Benzophenone-based ultraviolet absorber*7 |  | — | — | — | — | — | — | — | — | — | — |
| Phosphorus-based antioxidant*8 |  | — | — | — | — | — | — | — | — | — | — |
| Talc |  | — | — | — | — | — | — | — | — | — | — |
| Storage stability (agglomeration resistance) level | 50° C. | 2 | 2 | 1 | 1 | 2 | 2 | 1 | 1 | 2 | 2 |
|  | 60° C. | 2 | 2 | 1 | 1 | 2 | 2 | 2 | 1 | 2 | 2 |

*1 NOVATEC MA3, manufactured by Japan Polypropylene Corporation
*2 Mixture of Compound No. 1 and Compound No. 2 (manufactured by ADEKA Corporation, melting point: 33° C.)
*3 Hexadecyl-3,5-di-tert-butyl-4-hydroxybenzoate, melting point: 62° C.
*4 2-(2-hydroxy-5-methylphenyl)benzotriazole (manufactured by ADEKA Corporation, trade name: ADK STAB LA-32)
*5 manufactured by ADEKA Corporation, trade name: ADK STAB LA-31
*6 manufactured by ADEKA Corporation, trade name: ADK STAB NA-11
*7 2-hydroxy-4-n-octoxybenzophenone (manufactured by ADEKA Corporation, trade name: ADK STAB 1413)
*8 Tris(2,4-di-tert-butylphenyl)phosphite (manufactured by ADEKA Corporation, trade name: ADK STAB 2112)

TABLE 3

|  |  | Example |  |  |  |  |  |  |  |  |  |
|---|---|---|---|---|---|---|---|---|---|---|---|
|  |  | 23 | 24 | 25 | 26 | 27 | 28 | 29 | 30 | 31 | 32 |
| Component (A) | Polypropylene*1 | 100 | 100 | 100 | 100 | 100 | 100 | 100 | 100 | 100 | 100 |
| Component (B) | ADK STAB LA-40*2 | 70 | 70 | 70 | 70 | 70 | 70 | 100 | 100 | 100 | 100 |
|  | Compound No. 30*3 | — | — | 35 | 35 | 35 | 35 | 50 | 50 | 50 | 50 |
| Component (C) | Benzotriazole-based ultraviolet absorber*4 | 2.5 | — | 1.0 | 2.5 | — | — | 3.0 | 4.0 | — | — |
|  | Compound No. 7*5 | — | 2.5 | — | — | 1.0 | 2.5 | — | — | 3.0 | 4.0 |
| Component (D) | Compound No. 18*6 | 1.2 | 1.2 | 1.2 | 1.2 | 1.2 | 1.2 | 1.2 | 1.2 | 1.2 | 1.2 |
| Benzophenone-based ultraviolet absorber*7 |  | — | — | — | — | — | — | — | — | — | — |
| Phosphorus-based antioxidant*8 |  | — | — | — | — | — | — | — | — | — | — |
| Talc |  | — | — | — | — | — | — | — | — | — | — |

TABLE 3-continued

|  |  | Example | | | | | | | | | |
|---|---|---|---|---|---|---|---|---|---|---|---|
|  |  | 23 | 24 | 25 | 26 | 27 | 28 | 29 | 30 | 31 | 32 |
| Storage stability (agglomeration resistance) level | 50° C. | 1 | 1 | 1 | 1 | 1 | 1 | 1 | 1 | 1 | 1 |
|  | 60° C. | 1 | 1 | 1 | 1 | 1 | 1 | 1 | 1 | 1 | 1 |

*[1]NOVATEC MA3, manufactured by Japan Polypropylene Corporation
*[2]Mixture of Compound No. 1 and Compound No. 2 (manufactured by ADEKA Corporation, melting point: 33° C.)
*[3]Hexadecyl-3,5-di-tert-butyl-4-hydroxybenzoate, melting point: 62° C.
*[4]2-(2-hydroxy-5-methylphenyl)benzotriazole (manufactured by ADEKA Corporation, trade name: ADK STAB LA-32)
*[5]manufactured by ADEKA Corporation, trade name: ADK STAB LA-31
*[6]manufactured by ADEKA Corporation, trade name: ADK STAB NA-11
*[7]2-hydroxy-4-n-octoxybenzophenone (manufactured by ADEKA Corporation, trade name: ADK STAB 1413)
*[8]Tris(2,4-di-tert-butylphenyl)phosphite (manufactured by ADEKA Corporation, trade name: ADK STAB 2112)

TABLE 4

|  |  | Comparative Example | | | | | | | | |
|---|---|---|---|---|---|---|---|---|---|---|
|  |  | 1 | 2 | 3 | 4 | 5 | 6 | 7 | 8 | 9 |
| Component (A) | Polypropylene*[1] | 100 | 100 | 100 | 100 | 100 | 100 | 100 | 100 | 100 |
| Component (B) | ADK STAB LA-40*[2] | 100 | 100 | 100 | 100 | 100 | 350 | 350 | 350 | 350 |
|  | Compound No. 30*[3] | — | — | — | — | — | — | — | — | — |
| Component (C) | Benzotriazole-based ultraviolet absorber*[4] | — | 0.5 | 30.0 | — | — | 24.0 | — | 30.0 | — |
|  | Compound No. 7*[5] | — | — | — | 0.5 | 30.0 | — | 24.0 | — | 30.0 |
| Component (D) | Compound No. 18*[6] | 1.2 | 1.2 | 1.2 | 1.2 | 1.2 | 1.2 | 1.2 | 1.2 | 1.2 |
| Benzophenone-based ultraviolet absorber*[7] |  | — | — | — | — | — | — | — | — | — |
| Phosphorus-based antioxidant*[8] |  | — | — | — | — | — | — | — | — | — |
| Talc |  | — | — | — | — | — | — | — | — | — |
| Storage stability (agglomeration resistance) level | 50° C. | 4 | 4 | — | 3 | — | 5 | 5 | 5 | 5 |
|  | 60° C. | 5 | 4 | — | 4 | — | 5 | 5 | 5 | 4 |

*[1]NOVATEC MA3, manufactured by Japan Polypropylene Corporation
*[2]Mixture of Compound No. 1 and Compound No. 2 (manufactured by ADEKA Corporation, melting point: 33° C.)
*[3]Hexadecyl-3,5-di-tert-butyl-4-hydroxybenzoate, melting point: 62° C.
*[4]2-(2-hydroxy-5-methylphenyl)benzotriazole (manufactured by ADEKA Corporation, trade name: ADK STAB LA-32)
*[5]manufactured by ADEKA Corporation, trade name: ADK STAB LA-31
*[6]manufactured by ADEKA Corporation, trade name: ADK STAB NA-11
*[7]2-hydroxy-4-n-octoxybenzophenone (manufactured by ADEKA Corporation, trade name: ADK STAB 1413)
*[8]Tris(2,4-di-tert-butylphenyl)phosphite (manufactured by ADEKA Corporation, trade name: ADK STAB 2112)

TABLE 5

|  |  | Comparative Example | | | | | | | | | | | |
|---|---|---|---|---|---|---|---|---|---|---|---|---|---|
|  |  | 10 | 11 | 12 | 13 | 14 | 15 | 16 | 17 | 18 | 19 | 20 | 21 |
| Component (A) | Polypropylene*[1] | 100 | 100 | 100 | 100 | 100 | 100 | 100 | 100 | 100 | 100 | 100 | 100 |
| Component (B) | ADK STAB LA-40*[2] | 100 | 100 | 100 | 100 | 100 | 100 | 100 | 100 | 100 | 100 | 100 | 100 |
|  | Compound No. 30*[3] | — | — | — | — | — | — | — | — | — | — | — | — |
| Component (C) | Benzotriazole-based ultraviolet absorber*[4] | — | — | — | — | — | — | — | — | — | — | — | — |
|  | Compound No. 7*[5] | — | — | — | — | — | — | — | — | — | — | — | — |
| Component (D) | Compound No. 18*[6] | 1.2 | 1.2 | 1.2 | 1.2 | 1.2 | 1.2 | 1.2 | 1.2 | 1.2 | 1.2 | 1.2 | 1.2 |
| Benzophenone-based ultraviolet absorber*[7] |  | 1.6 | 3.0 | 4.0 | 6.0 | — | — | — | — | — | — | — | — |
| Phosphorus-based antioxidant*[8] |  | — | — | — | — | 1.6 | 3.0 | 4.0 | 6.0 | — | — | — | — |
| Talc |  | — | — | — | — | — | — | — | — | 1.6 | 3.0 | 4.0 | 6.0 |
| Storage stability (agglomeration resistance) level | 50° C. | 3 | 3 | 3 | 3 | 4 | 4 | 4 | 5 | 4 | 4 | 4 | 4 |
|  | 60° C. | 3 | 4 | 5 | 5 | 4 | 4 | 4 | 5 | 4 | 4 | 4 | 4 |

*[1]NOVATEC MA3, manufactured by Japan Polypropylene Corporation
*[2]Mixture of Compound No. 1 and Compound No. 2 (manufactured by ADEKA Corporation, melting point: 33° C.)
*[3]Hexadecyl-3,5-di-tert-butyl-4-hydroxybenzoate, melting point: 62° C.
*[4]2-(2-hydroxy-5-methylphenyl)benzotriazole (manufactured by ADEKA Corporation, trade name: ADK STAB LA-32)
*[5]manufactured by ADEKA Corporation, trade name: ADK STAB LA-31
*[6]manufactured by ADEKA Corporation, trade name: ADK STAB NA-11
*[7]2-hydroxy-4-n-octoxybenzophenone (manufactured by ADEKA Corporation, trade name: ADK STAB 1413)
*[8]Tris(2,4-di-tert-butylphenyl)phosphite (manufactured by ADEKA Corporation, trade name: ADK STAB 2112)

TABLE 6

|  |  | Example | | | | Comparative Example | | |
| --- | --- | --- | --- | --- | --- | --- | --- | --- |
|  |  | 33 | 34 | 35 | 36 | 22 | 23 | 24 |
| Component (A) | Polypropylene*[1] | 100 | 100 | 100 | 100 | 100 | 100 | 100 |
| Component (B) | ADK STAB LA-40*[2] | 100 | 100 | 100 | 100 | 100 | 100 | 100 |
|  | Compound No. 30*[3] | — | — | 50 | 50 | — | 50 | 50 |
| Component (C) | Benzotriazole-based ultraviolet absorber*[4] | 3.0 | — | 3.0 | — | — | — | — |
|  | Compound No. 7*[5] | — | 3.0 | — | 3.0 | — | — | — |
| Component (D) | Compound No. 18*[6] | — | — | — | — | — | — | 1.2 |
| Benzophenone-based ultraviolet absorber*[7] | | — | — | — | — | — | — | — |
| Phosphorus-based antioxidant*[8] | | — | — | — | — | — | — | — |
| Talc | | — | — | — | — | — | — | — |
| Storage stability (agglomeration resistance) level | 50° C. | 2 | 2 | 2 | 2 | 5 | 5 | 4 |
|  | 60° C. | 2 | 2 | 2 | 2 | 5 | 5 | 5 |

*[1]NOVATEC MA3, manufactured by Japan Polypropylene Corporation
*[2]Mixture of Compound No. 1 and Compound No. 2 (manufactured by ADEKA Corporation, melting point: 33° C.)
*[3]Hexadecyl-3,5-di-tert-butyl-4-hydroxybenzoate, melting point: 62° C.
*[4]2-(2-hydroxy-5-methylphenyl)benzotriazole (manufactured by ADEKA Corporation, trade name: ADK STAB LA-32)
*[5]manufactured by ADEKA Corporation, trade name: ADK STAB LA-31
*[6]manufactured by ADEKA Corporation, trade name: ADK STAB NA-11
*[7]2-hydroxy-4-n-octoxybenzophenone (manufactured by ADEKA Corporation, trade name: ADK STAB 1413)
*[8]Tris(2,4-di-tert-butylphenyl)phosphite (manufactured by ADEKA Corporation, trade name: ADK STAB 2112)

As seen from the results shown in the above Tables 1 to 6, in Examples according to the present invention, it was confirmed that a resin additive masterbatch having excellent storage stability (agglomeration resistance) of a pellet prepared therefrom can be obtained. That is, it was confirmed that, even in a masterbatch pellet containing a low-melting-point resin additive at a high concentration in which agglomeration readily occurs by nature, the storage stability can be improved by incorporating a benzotriazole-based ultraviolet absorber.

The invention claimed is:

1. A resin additive masterbatch, comprising:
with respect to 100 parts by mass of (A) a polyolefin resin, 65 to 300 parts by mass of (B) a resin additive having a melting point of not higher than 80° C. comprises at least one hindered amine compound represented by the following Formula (1)

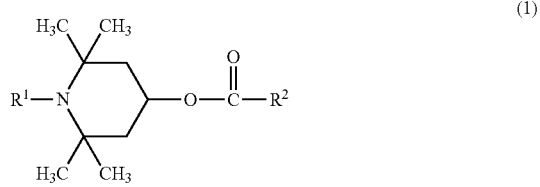
(1)

wherein, $R^1$ represents a hydrogen atom; and $R^2$ represents an alkyl group having 1 to 30 carbon atoms; and 0.8 to 24 parts by mass of (C) a benzotriazole-based ultraviolet absorber of at least one compound represented by the following Formula (2) and/or (5):

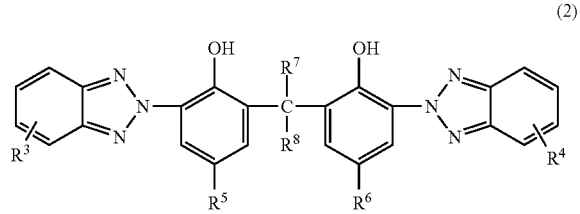
(2)

wherein, $R^3$ and $R^4$ each independently represent a hydrogen atom or a methyl group; $R^5$ and $R^6$ each independently represent an alkyl group having 1 to 18 carbon atoms; and $R^7$ and $R^8$ each represent a hydrogen atom; and

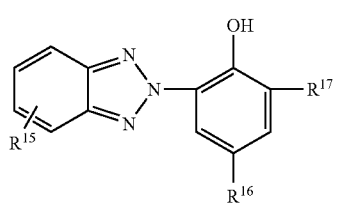
(5)

wherein, $R^{15}$ represents a hydrogen atom; and $R^{16}$ and $R^{17}$ each independently represent a hydrogen atom, an alkyl group having 1 to 18 carbon atoms or an aralkyl group having 7 to 18 carbon atoms.

2. The resin additive masterbatch according to claim 1, wherein said $R^2$ in said Formula (1) is a mixture of alkyl groups having 8 to 26 carbon atoms.

3. The resin additive masterbatch according to claim 1, wherein
said (B) resin additive having a melting point of not higher than 80° C. further comprises at least one benzoate compound represented by the following Formula (4); and
the content ratio of said hindered amine compound and said benzoate compound is, in terms of mass ratio, in the range of 1:1 to 4:1:

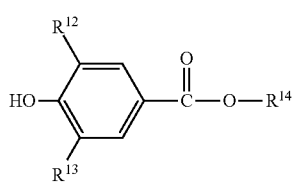
(4)

wherein, $R^{12}$ and $R^{13}$ each independently represent a hydrogen atom, an alkyl group having 1 to 12 carbon atoms or an arylalkyl group having 7 to 30 carbon atoms; and $R^{14}$ represents an alkyl group having 1 to 30 carbon atoms.

4. The resin additive masterbatch according to claim 1, which further comprises at least one (D) metal aromatic phosphate represented by the following Formula (3) in an amount of 0.3 to 5 parts by mass with respect to 100 parts by mass of said (A) polyolefin resin:

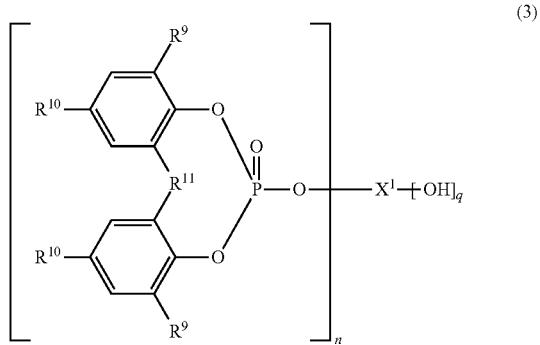

(3)

wherein, $R^9$ represents an alkyl group having 4 to 8 carbon atoms; $R^{10}$ represents a hydrogen atom or an alkyl group having 1 to 8 carbon atoms; $R^{11}$ represents an alkylidene group having 1 to 4 carbon atoms; and $X^1$ represents an alkali metal atom, an alkaline earth metal atom or an aluminum atom, with provisos that: when $X^1$ is an alkali metal atom, n is 1 and q is 0; when $X^1$ is an alkaline earth metal atom, n is 2 and q is 0; and when $X^1$ is an aluminum atom, n is 1 or 2 and q is (3-n).

5. The resin additive masterbatch according to claim 2, which further comprises at least one (D) metal aromatic phosphate represented by the following Formula (3) in an amount of 0.3 to 5 parts by mass with respect to 100 parts by mass of said (A) polyolefin resin:

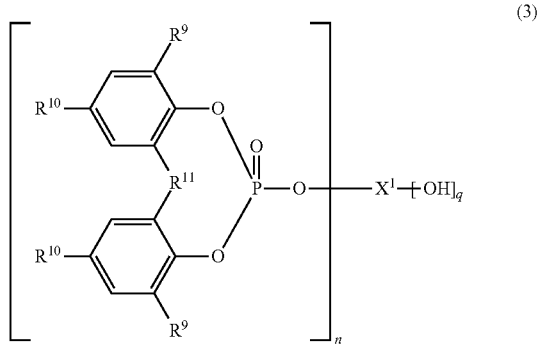

(3)

wherein, $R^9$ represents an alkyl group having 4 to 8 carbon atoms; $R^{10}$ represents a hydrogen atom or an alkyl group having 1 to 8 carbon atoms; $R^{11}$ represents an alkylidene group having 1 to 4 carbon atoms; and $X^1$ represents an alkali metal atom, an alkaline earth metal atom or an aluminum atom, with provisos that: when $X^1$ is an alkali metal atom, n is 1 and q is 0; when $X^1$ is an alkaline earth metal atom, n is 2 and q is 0; and when $X^1$ is an aluminum atom, n is 1 or 2 and q is (3-n).

6. The resin additive masterbatch according to claim 3, which further comprises at least one (D) metal aromatic phosphate represented by the following Formula (3) in an amount of 0.3 to 5 parts by mass with respect to 100 parts by mass of said (A) polyolefin resin:

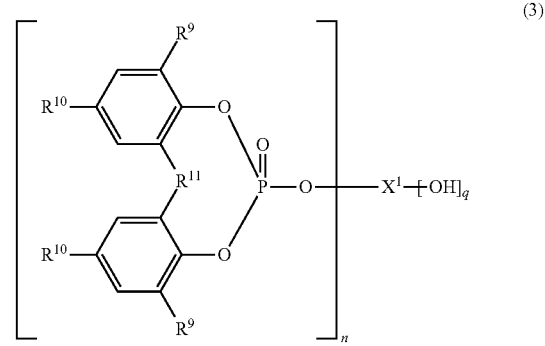

(3)

wherein, $R^9$ represents an alkyl group having 4 to 8 carbon atoms; $R^{10}$ represents a hydrogen atom or an alkyl group having 1 to 8 carbon atoms; $R^{11}$ represents an alkylidene group having 1 to 4 carbon atoms; and $X^1$ represents an alkali metal atom, an alkaline earth metal atom or an aluminum atom, with provisos that: when $X^1$ is an alkali metal atom, n is 1 and q is 0; when $X^1$ is an alkaline earth metal atom, n is 2 and q is 0; and when $X^1$ is an aluminum atom, n is 1 or 2 and q is (3-n).

7. A polyolefin resin composition, comprising the resin additive masterbatch according to claim 1 and a polyolefin resin.

8. The resin additive masterbatch of claim 1, wherein said (C) benzotriazole-based ultraviolet absorber is at least one compound represented by the Formula (2).

9. The resin additive masterbatch of claim 1, wherein said (C) benzotriazole-based ultraviolet absorber is at least one compound represented by the Formula (5).

* * * * *